(12) United States Patent
Feki et al.

(10) Patent No.: US 12,352,875 B2
(45) Date of Patent: Jul. 8, 2025

(54) POSITION DETERMINATION

(71) Applicant: Nokia Technologies Oy, Espoo (FI)

(72) Inventors: Afef Feki, Sceaux (FR); Pavan Koteshwar Srinath, Orsay (FR)

(73) Assignee: Nokia Technologies Oy, Espoo (FI)

( * ) Notice: Subject to any disclaimer, the term of this patent is extended or adjusted under 35 U.S.C. 154(b) by 481 days.

(21) Appl. No.: 17/641,918

(22) PCT Filed: Sep. 17, 2020

(86) PCT No.: PCT/EP2020/075954
§ 371 (c)(1),
(2) Date: Mar. 10, 2022

(87) PCT Pub. No.: WO2021/053063
PCT Pub. Date: Mar. 25, 2021

(65) Prior Publication Data
US 2022/0349979 A1 Nov. 3, 2022

(30) Foreign Application Priority Data
Sep. 20, 2019 (GB) .................................... 1913574

(51) Int. Cl.
*G01S 5/02* (2010.01)
*G01S 5/00* (2006.01)
(52) U.S. Cl.
CPC .......... *G01S 5/0036* (2013.01); *G01S 5/0063* (2013.01); *G01S 5/0252* (2013.01)
(58) Field of Classification Search
CPC ..... G01S 5/0036; G01S 5/0063; G01S 5/0252
USPC .................................. 342/464, 450
See application file for complete search history.

(56) References Cited

U.S. PATENT DOCUMENTS

| 7,228,136 B2 * | 6/2007 | Myllymaki ......... G01S 5/02521 |
| | | 455/456.1 |
| 8,149,162 B1 | 4/2012 | Pauls ........................... 342/351 |
| 8,188,920 B2 * | 5/2012 | Thomson ............. G01S 5/0278 |
| | | 342/450 |

(Continued)

FOREIGN PATENT DOCUMENTS

| CN | 109964141 A | 7/2019 | |
| CN | 113728692 A * | 11/2021 | ........... G01S 5/0236 |
| WO | WO 02/054813 A1 | 7/2002 | |

OTHER PUBLICATIONS

Chiou et al., "An adaptive location estimator using tracking algorithms for indoor WLANs," Wireless Networks, The Journal of Mobile Communication, Mar. 6, 2010, vol. 16, No. 7.

*Primary Examiner* — Chuong P Nguyen
(74) *Attorney, Agent, or Firm* — McCarter & English, LLP (57) ABSTRACT

An apparatus, method and computer program are disclosed. The apparatus may include circuitry configured for receiving from a target device, at a first time instance, a set of first measurement data associated with each of a plurality of base stations and determining a first position of the target device based on the received first sets of measurement data. The circuitry may also receive from the target device, at each of one or more subsequent time instances, a second set of measurement data associated with one, or each of a smaller number, of the base stations and determining, at each of the one or more subsequent time instances, a respective position of the target device based on the position determined at a previous time instance and the second set of measurement data.

18 Claims, 9 Drawing Sheets

(56) References Cited

U.S. PATENT DOCUMENTS

| | | | |
|---|---|---|---|
| 8,483,706 B2* | 7/2013 | Edge | G01S 5/02521 |
| | | | 455/456.1 |
| 8,918,115 B2* | 12/2014 | Zhang | G01S 19/48 |
| | | | 455/456.2 |
| 9,119,169 B2* | 8/2015 | Luo | H04W 64/003 |
| 9,363,782 B2* | 6/2016 | Tenny | H04W 64/00 |
| 9,591,533 B2* | 3/2017 | Song | H04B 17/24 |
| 9,807,560 B2* | 10/2017 | Rehnberg | G01S 5/0205 |
| 10,247,828 B2 | 4/2019 | Riley et al. | 19/39 |
| 10,634,759 B2* | 4/2020 | Kim | G01S 5/0036 |
| 10,698,071 B2* | 6/2020 | Kautz | H04W 4/025 |
| 11,997,563 B2* | 5/2024 | Opshaug | G01S 5/10 |
| 2004/0072577 A1 | 4/2004 | Myllymaki et al. | |
| 2011/0074635 A1* | 3/2011 | Yeo | G01S 5/021 |
| | | | 342/464 |
| 2011/0298658 A1 | 12/2011 | Riley et al. | 342/357.26 |
| 2014/0375505 A1* | 12/2014 | Anderson | G01S 5/0226 |
| | | | 342/464 |
| 2015/0105099 A1 | 4/2015 | Luo et al. | |
| 2016/0170004 A1* | 6/2016 | Kim | G01S 5/0242 |
| | | | 342/451 |
| 2020/0280820 A1* | 9/2020 | Zhang | G01S 5/0244 |
| 2021/0345287 A1* | 11/2021 | Alawieh | H04W 64/00 |
| 2022/0046577 A1* | 2/2022 | Sundararajan | G01S 5/0278 |
| 2024/0297760 A1* | 9/2024 | Zorgui | G01S 5/0294 |

* cited by examiner

POSITION DETERMINATION

CROSS REFERENCE TO RELATED APPLICATION

This patent application is a U.S. National Stage application of International Patent Application Number PCT/EP2020/075954 filed Sep. 17, 2020 which is hereby incorporated by reference in its entirety, and claims priority to GB 1913574.8 filed Sep. 20, 2019.

FIELD

Example embodiments relate to position determination, for example apparatuses and methods for determining the geographic position of user equipment.

BACKGROUND

Determining the position of a target device may be useful in various applications. For example, the target device may be a mobile telephone and position determination may enable locating the origin of an emergency telephone call and/or performing optimization at the telephone network, such as for radio resource management (RRM).

In the context of mobile telephone networks, the Global Navigation Satellite System (GNSS) may be used to provide positioning in outdoor environments, assuming a GNSS receiver is provided on the target device and/or there are enough satellite signals to enable position determination. This may not be the case if the target device is indoors or in a particularly built-up environment. The use of radio signals between the target device and one or more base stations can also be used as an additional way of determining position, including for indoor environments.

SUMMARY

The scope of protection sought for various embodiments of the invention is set out by the independent claims. The embodiments and features, if any, described in the specification that do not fall under the scope of the independent claims are to be interpreted as examples useful for understanding various embodiments of the invention.

According to one aspect, there is provided an apparatus, comprising means for: receiving from a target device, at a first time instance, a set of first measurement data associated with each of a plurality of base stations; determining a first position of the target device based on the received first sets of measurement data; receiving from the target device, at each of one or more subsequent time instances, a second set of measurement data associated with one, or each of a smaller number, of the base stations; and determining, at each of the one or more subsequent time instances, a respective position of the target device based on the position determined at a previous time instance and the second set of measurement data.

The apparatus may further comprise means for causing transmission by the target device of the first sets of measurement data at the first time instance and the second set(s) of measurement data at the subsequent time instances. The apparatus may further comprise means for causing transmission by the target device of first sets of measurement data at repeating periods, and of second set(s) of measurement data at one or more sub-intervals within each period. Only one second set of measurement data may be received, associated with a serving base station for the target device. The first sets of measurement data may be associated with a serving base station and one or more neighbouring base stations for the target device. The first and second sets of measurement data may represent reference signal received power (RSRP) measurements determined by the target device for reference signals from the base stations. The determined position at previous time instances may be stored in a memory device of the apparatus. Determining, at each of the one or more subsequent time instances, a respective position of the target device may be based on a machine-learning model that determines a functional relationship of the respective position to the position determined at a previous time instance and the second set of measurement data. The machine-learning model may comprise a convolutional neural network and a recurrent neural network. The apparatus may be a positioning node of a radio communications network.

According to another aspect, there may be provided a method, comprising: receiving from a target device, at a first time instance, a set of first measurement data associated with each of a plurality of base stations; determining a first position of the target device based on the received first sets of measurement data; receiving from the target device, at each of one or more subsequent time instances, a second set of measurement data associated with one, or each of a smaller number, of the base stations; and determining, at each of the one or more subsequent time instances, a respective position of the target device based on the position determined at a previous time instance and the second set of measurement data.

The method may further comprise causing transmission by the target device of the first sets of measurement data at the first time instance and the second set(s) of measurement data at the subsequent time instances. The method may further comprise causing transmission by the target device of first sets of measurement data at repeating periods, and of second set(s) of measurement data at one or more sub-intervals within each period. Only one second set of measurement data may be received, associated with a serving base station for the target device. The first sets of measurement data may be associated with a serving base station and one or more neighbouring base stations for the target device. The first and second sets of measurement data may represent reference signal received power (RSRP) measurements determined by the target device for reference signals from the base stations. The method may further comprise storing the determined position at previous time instances in a memory device. Determining, at each of the one or more subsequent time instances, a respective position of the target device may be based on a machine-learning model that determines a functional relationship of the respective position to the position determined at a previous time instance and the second set of measurement data. The machine-learning model may comprise a convolutional neural network and a recurrent neural network. The method may be performed at a positioning node of a radio communications network, According to another aspect, there may be provided an apparatus comprising at least one processor, at least one memory directly connected to the at least one processor, the at least one memory including computer program code, and the at least one processor, with the at least one memory and the computer program code being arranged to perform the method of: receiving from a target device, at a first time instance, a set of first measurement data associated with each of a plurality of base stations; determining a first position of the target device based on the received first sets of measurement data; receiving from the target device, at each of one or more subsequent time instances, a second set of measurement data associated with one, or each of a smaller number, of the base stations; and determining, at each of the one or more subsequent time instances, a respective position of the target device based on the position determined at a previous time instance and the second set of measurement data.

According to another aspect, there may be provided a computer program product comprising a set of instructions which, when executed on an apparatus, is configured to cause the apparatus to carry out the method of: receiving from a target device, at a first time instance, a set of first measurement data associated with each of a plurality of base stations; determining a first position of the target device based on the received first sets of measurement data; receiving from the target device, at each of one or more subsequent time instances, a second set of measurement data associated with one, or each of a smaller number, of the base stations; determining, at each of the one or more subsequent time instances, a respective position of the target device based on the position determined at a previous time instance and the second set of measurement data.

According to another aspect, there may be provided a non-transitory computer readable medium comprising program instructions stored thereon for performing a method, comprising: receiving from a target device, at a first time instance, a set of first measurement data associated with each of a plurality of base stations; determining a first position of the target device based on the received first sets of measurement data; receiving from the target device, at each of one or more subsequent time instances, a second set of measurement data associated with one, or each of a smaller number, of the base stations; and determining, at each of the one or more subsequent time instances, a respective position of the target device based on the position determined at a previous time instance and the second set of measurement data.

BRIEF DESCRIPTION OF THE DRAWINGS

Example embodiments will be described by way of non-limiting example, with reference to the accompanying drawings, in which.

DETAILED DESCRIPTION

Example embodiments relate to positioning systems and methods.

The following abbreviations may be used herein:
3G/4G/5G Third, Fourth and Fifth Generation Cellular Network Technology;
AMF Access and Mobility Function;
BS Base Station;
BSC Base Station Controller;
eNodeB Enhanced NodeB;
ESM Enhanced Set of Measurements;
FCN Fully Connected Network;
gNB Next Generation NodeB;
LCS Location Service;
LMF Location Management Function;
LUT Look-up Table;
RAN Radio Access Network;
RNC Radio Network Controller;
RNN Recurrent Neural Network;
RSRP Reference Signal Received Power; and
UE User Equipment.

Example embodiments relate to determining the position of a target device, for example a UE, based on signals associated with base stations. A base station may comprise any node of a RAN having a known location and which provides radio transmission (and usually receiving) functionality via one or more antennas to an associated coverage area. A base station may be referred to herein as a NodeB but the term is interchangeable with any such node mentioned above. In the context of 4G, a base station is sometimes called an eNodeB, and in the context of 5G, a base station is sometimes called a gNB. Example embodiments are appropriate to any future generation of cellular network technology. Example embodiments may involve the use of multiple spatially-separate base stations, each of which has a coverage area commonly known as a cell within which it can reliably transmit and receive data-carrying signals. There may be some coverage overlap between neighbouring cells. Each base station may transmit reference signals that can be used, at least in part, to estimate the position of a UE. It is common for a UE to receive signals from two or more base stations. One of the base stations will typically be designated a serving base station, and its corresponding cell as a serving cell, usually based on some measured parameter such as signal strength and/or quality of service. A serving base station/cell may sometimes be referred to as the primary base station/cell and may change over time, e.g. during handover.

Any form of UE capable of receiving data over a network from spatially-separate base stations may be used, and UEs may include smartphones, tablet computers, laptops, personal computers and so on.

Each cell may be identified by an identity within the local radio area, which identity is broadcast in the cell. The base stations communicate over the air interface operating on radio frequencies with the UE within range of the base stations. In some versions of the RAN, several base stations are typically connected (e.g., by landlines or microwave) to a controller node (such as a RNC or a BSC) which supervises and coordinates various activities of the plural base stations connected thereto. The RNCs are typically connected to one or more core networks.

There are a number of known methods for determining position of a UE, some of which are based on Observed Time Difference of Arrival (OTDOA) and Positioning enhanced Cell ID (E-CID). Example embodiments herein relate to the use of Reference Signal Received Power (RSRP) measurements. The concept and measurement of RSRP will be known. Embodiments may be applicable to other positioning techniques. In overview, a database of expected RSRPs for all relevant base stations within a coverage zone may be created. Messaging Reports (MRs) from UEs, which MRs may include RSRP measurements for at least the serving, and possibly for neighbouring cells, may be correlated with the database to identify the best matching point as the UEs current location. This method of localization may be referred to as fingerprinting, whereby each RSRP measurement stored in the database is a form of fingerprint as to position. Other measurement types can be used.

Figure 1:
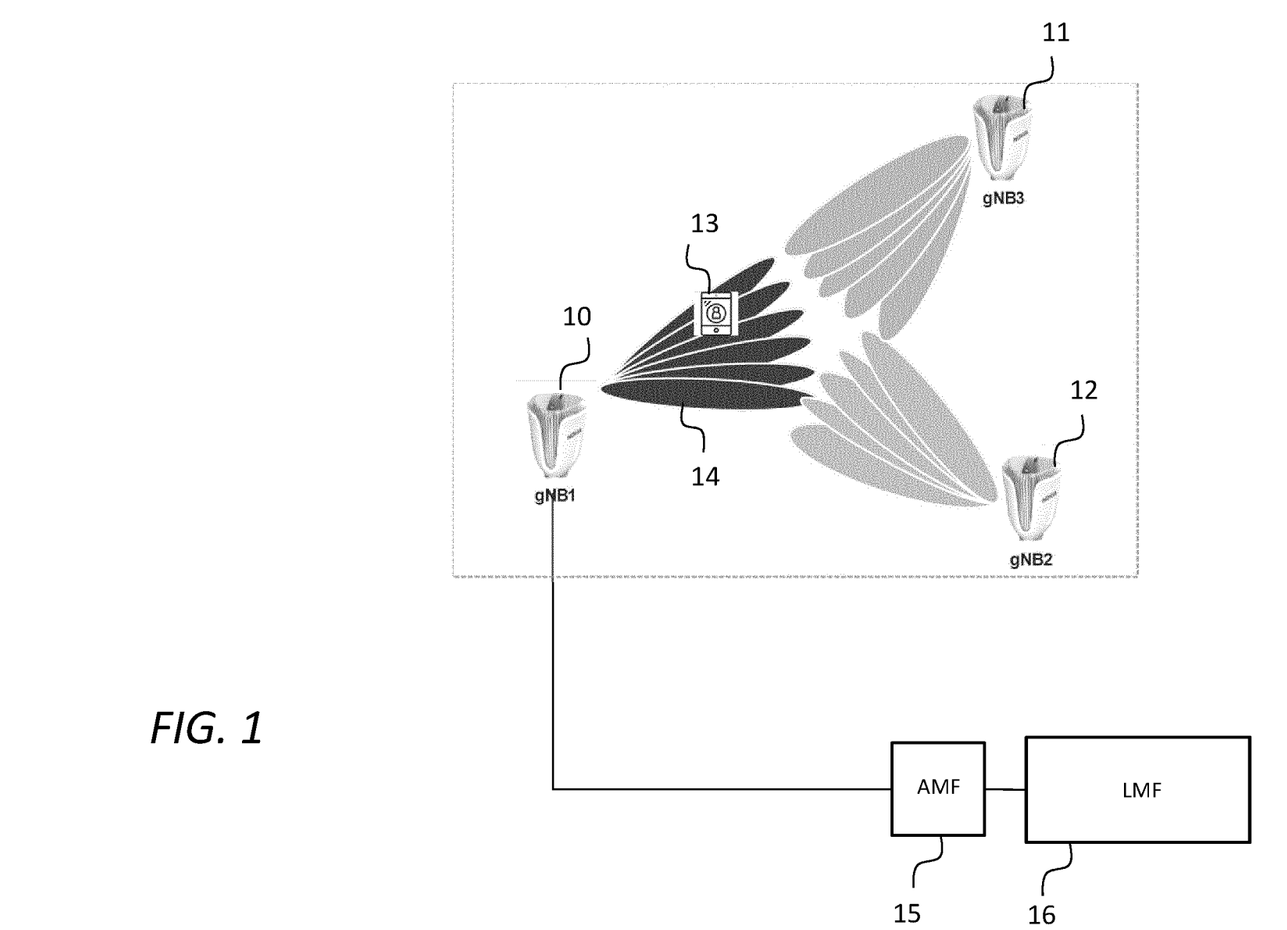
FIG. 1 is a schematic diagram of part of a radio network, including three base stations, a user equipment and part of a core network.

In the context of 5G, base stations (gNBs) will utilise antenna arrays to transmit over one or more respective beams. Referring to FIG. 1, there is shown a scenario involving three gNBs 10, 11, 12. The first gNB is a serving base station for a serving cell for a target UE 13. The other two 11, 12 are neighbouring gNBs for neighbouring cells. Practically, the UE 13 may measure the quality on transmitted beams 14 from the serving and neighbouring cells. Nevertheless, in general, only a subset of these measurements may be reported to the serving cell. This subset may correspond only to the best measured beams on the serving cell. Upon predefined triggering conditions, the UE 13 may also report the measurements from neighbouring cells to its serving cell (e.g. in case of a handover triggering event). This limitation in the measurement reporting is done for signalling overhead optimization.

In example embodiments, beam RSRP measurements that are available at the serving gNB 10 are used as input for positioning.

The following parts of the disclosure will refer only to gNBs 10, 11, 12 as examples of base stations. However, other embodiments may use other forms of base station.

Each of the gNBs 10, 11, 12 may be connected to a management part of the network. This may be referred to as the core network. The core network may include (in the context of 5G) an AMF 15 and an LMF 6. The AMF 36 is part of the 3GPP 5G architecture and has the main tasks of registration management, connection management, reachability management, mobility management and various functions relating to security and access management and authorization. Other technologies may have equivalent functions, and the provision of the AMF 15 is not in itself essential to the example embodiments.

The LMF 38 is a part of the network that determines the position of the UE 13 and indeed may trigger measurement of the position.

Figure 2:
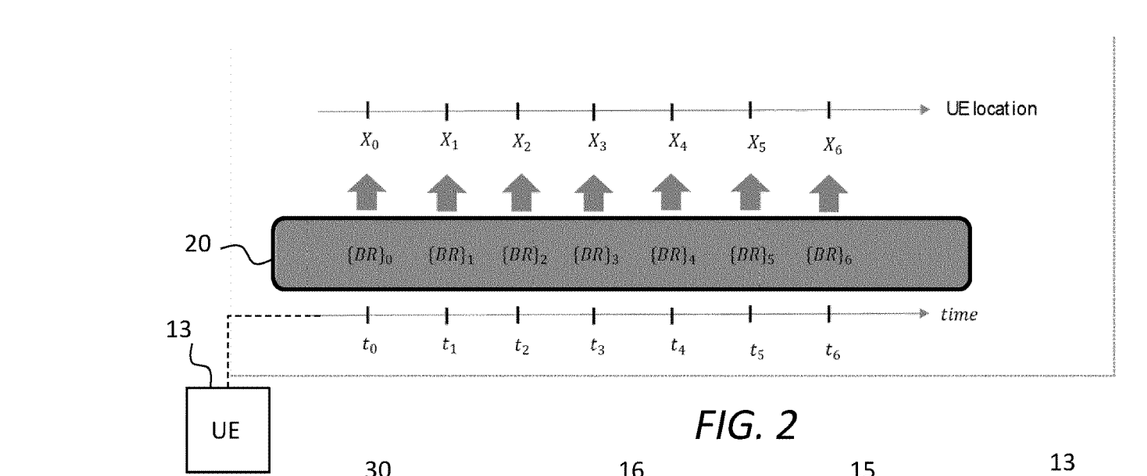
FIG. 2 is a schematic diagram of how the position of user equipment may be determined via Received Signal Received Power measurement reports as a function of time.

FIG. 2 depicts a schematic example of the UE 13 sending RSRP measurement reports 20 as a function of time which corresponds also to a motion trajectory. At each time instant $t_i$, the UE's position $(X_t)$ may be estimated at the AMF 15 as a function of the reported beam measurements (BR), denoted by $\{BR\}_t$. Achieved localization accuracy is highly dependent on the considered beam RSRP measurements, typically on the number of reported beams as well the number of cells (serving cell plus best neighbouring cells). For example, it may be observed that an approximate 2.6 m localization accuracy may be achieved with beam measurements from the serving cell, using the best four beams. It may also be observed that an approximate 1.5 m localization accuracy may be achieved with beam measurements from the serving cell and the two best neighbouring cells, with four beams reported from each cell.

These results may be achieved with a neural network-based method (e.g. 2 hidden layers, 500 nodes per hidden layer, and an activation function=tan h).

It is then straightforward to conclude that higher localization accuracy requires a larger set of beam measurements from the serving and the neighbouring cells. Example embodiments provide methods and apparatuses for achieving this higher localization accuracy whilst reducing or minimizing related signalling overhead, e.g. due to neighbouring cell measurement reporting.

Referring still to FIG. 2, each measurement report $\{BR\}_t$ may refer to RSRP as reported by the UE 13 to its current serving gNB 10 at respective time instances $t_i$. Reports may be made every $\delta_t$ seconds. In practice, only a subset of beams of the serving gNB 10 may be reported in each measurement report $\{BR\}_t$, e.g. four. Under some predefined conditions, more beams could be reported from neighbouring cells e.g. twenty to provide increased accuracy.

In order to reduce signalling overhead, example embodiments use a predefined time duration T, or period, such that every T seconds, the position of the UE 13 is estimated with higher accuracy using a measurement report including an enhanced set of measurements (ESM), e.g. a measurement report comprising RSRP measurements from the serving cell and one or more neighbouring cells. For example, RSRP measurements from two neighbouring cells may be used.

Between successive ESM reports, the reporting of measurements is limited to a smaller number of measurements, e.g. the minimum required. For example, if an ESM report is made at a time instant $t_o$, then at sub-intervals within the period T (e.g. $t_o+\delta_t$, $t_o+2\delta_t$, ..., $t_o+T-\delta_t$) only minimal measurement reporting may be performed. The position of the UE 13 at $t+\delta_t$ may be estimated as a function $f$ of its estimated position at a previous time instance t and the minimal measurement report $\{BR\}_{t+\delta_t}$ i.e.

$$X_{t+\delta_t}=f(X_t,BR_{t+\delta_t})$$

In some example embodiments, a machine learning model may be used to approximate the function $f$.

The determination of the position $X_t$ of the UE 13 may be performed at the LMF 16. At particular time instants, the LMF 16 or some other node of the network may trigger the UE 13 to report measurements. Particularly, the triggering may be performed responsive to a need for enhanced positioning using RSRP measurements from neighboring cells. Other reports, subsequent to an ESM report, are those already performed, or conventionally performed using beams from only the serving cell or a smaller number of cells.

Figure 3:
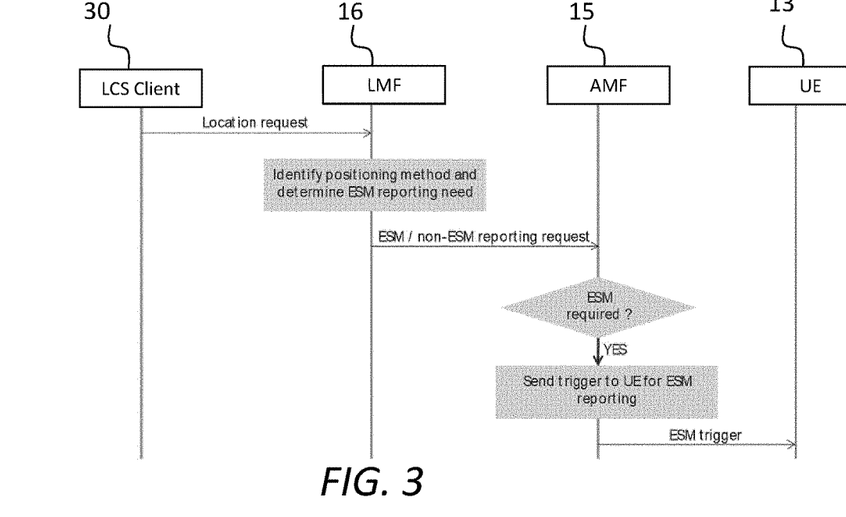
FIG. 3 is a signal timing diagram showing how the position of a user equipment may be triggered to send measurement reports, according to an example embodiment.

FIG. 3 provides a network timing diagram according to an example embodiment. The timing diagram represents signals sent and/or received by one or more of a LCS client 30, which may be any service requesting a current position of the UE 13, as well as the LMF 16 and AMF 15. Upon receipt of a location request from the LCS client 30, the LMF 16 may determine which positioning method is required (e.g. ESM or non-ESM). The LMF 16 may forward a reporting request to the AMF 15 identifying if an ESM report is required. If an ESM report is required, the AMF 15 may then send a trigger message to the UE 13 for ESM reporting, i.e. to send RSRP measurements for a predetermined number of beams associated with the serving gNB 10 and one or more neighboring gNBs 11, 12. This means that the ESM method can be triggered only when needed whilst ensuring location accuracy in the intervals between triggers. This leads to an important gain in terms of signaling overhead. Non-ESM reporting may be performed in any case as part of scheduling, which method can be used for the intervals between ESM reporting.

Figure 4:
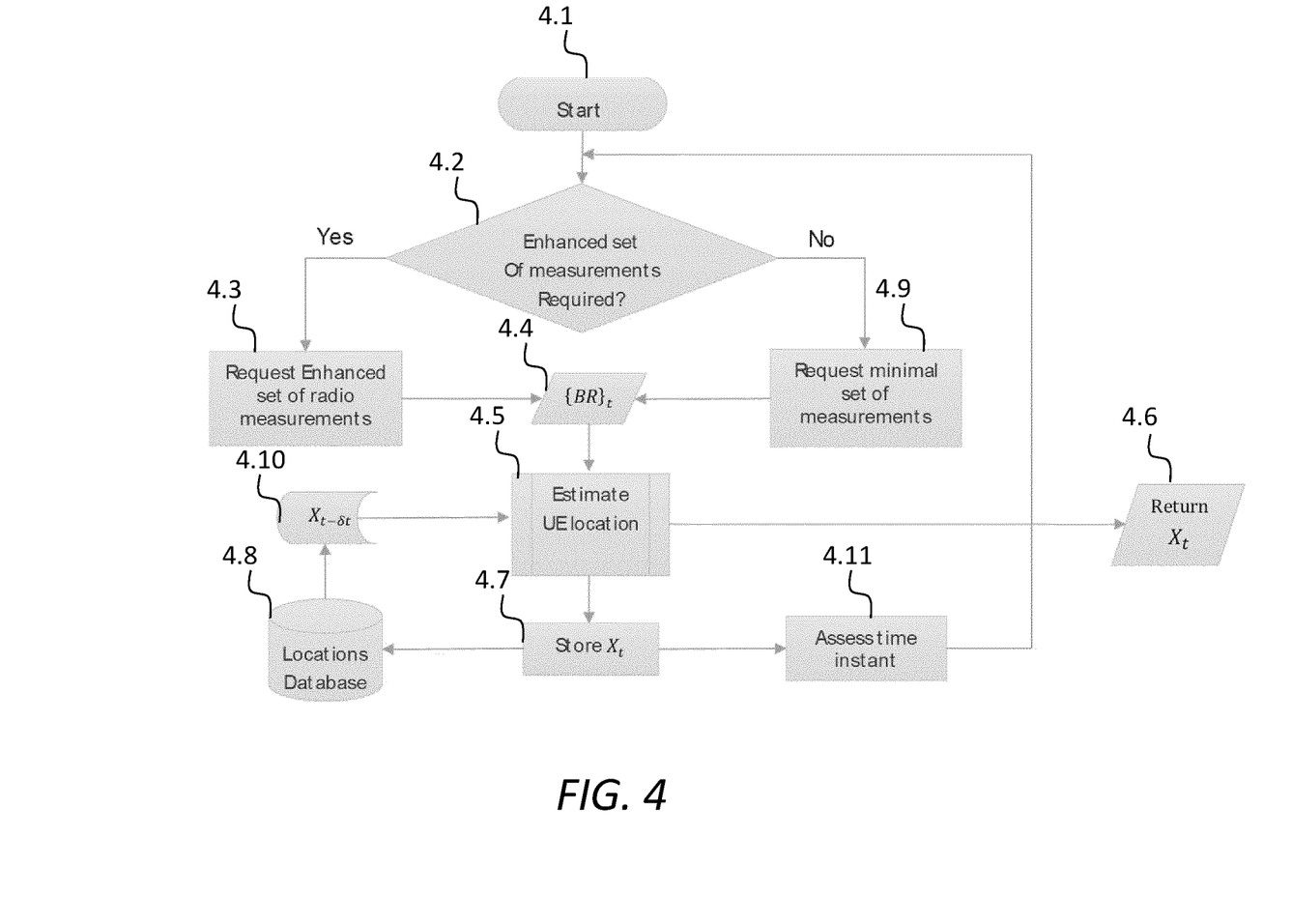
FIG. 4 is a flow diagram showing operations that may be performed at part of the core network to determine a user equipment position, according to an example embodiment.

FIG. 4 is a flow diagram indicating operations that may be performed in hardware, software, or a combination thereof at the LMF 16 or some other node. The numbering of operations is not necessarily indicative of the order of processing. Further or fewer operations may be provided in some embodiments.

Reference numeral 4.1 indicates a start condition, which may correspond to receiving a positioning request from a LCS client 30. At this stage, a determination of the time period T may be made; this may be a predetermined number, or one based on the type of LCS client 30 or a specific request from the LCS client 30. In some embodiments, the value of the time period parameter T may be estimated offline and stored in the network (e.g. at the LMF 16) in the form of an LUT where, for pairings of required localization accuracy and allowable signaling overhead, a value of T is associated.

In an operation 4.2, it is determined if ESM reporting is required. This may correspond to a time instance t=0, T, 2T and so on.

If ESM reporting is required, in an operation 4.3, the LMF 16 may request from the network a set of measurements in an ESM report $\{BR\}_t$.

In an operation 4.4, the LMF 16 may receive the ESM report $\{BR\}_t$ for that time instance. The ESM report $\{BR\}_t$ is received via the AMF 15 from the UE 13.

In an operation 4.5, the LMF 16 may determine from the measurements in the ESM report $\{BR\}_t$ the position ($X_t$) of the UE 13 from which ESM report was received. For example, the ESM report $\{BR\}_t$ may comprise measurements comprising RSRPs relating to each of four beams of the serving gNB 10, and RSRPs relating to each of four beams from each of two neighbouring gNBs 11, 12. The two neighbouring gNBs 11, 12 may be selected as the "best neighbours" based on the values of the RSRPs.

In an operation 4.6, the position ($X_t$) may be reported back to the LCS client 30.

In an operation 4.7, the position ($X_t$) may be stored in memory with the corresponding time instance, which memory may be a local memory of the LMF 16 or a different memory. For example, in an operation 4.8, the position ($X_t$) may be stored in a locations database.

At sub-intervals within the period T (e.g. $t_o+\delta_t$, $t_o+2\delta_t$, ... $t_o+T-\delta_t$), non-ESM reporting may be performed. As explained, this method may use conventional RSRP measurements from, for example, only the serving gNB 10, which measurements are already available as they are part of conventional signaling used for resource allocation. For example, these may comprise RSRP measurements for four beams of the serving gNB 10. No specific measurement reporting is therefore needed during these sub-intervals. Rather, the respective positions at the sub-intervals are based on a function $f$ of the previous position ($X_{t-\delta_t}$) as stored, and the available measurements associated with the serving gNB 10.

Hence, in operation 4.2, if ESM reporting is not required, operation 4.9, via operations 4.4 and 4.5, requests or simply uses the conventional number of RSRP measurements to estimate the UE's current position based on the measurement report $\{BR\}_t$ and the value of ($X_{t-\delta_t}$), as provided in an operation 4.10.

An operation 40.11 represents an assessment of the current time instance, which may involve monitoring a clock. The process may return to operation 40.2 for subsequent time instances.

Figure 5:
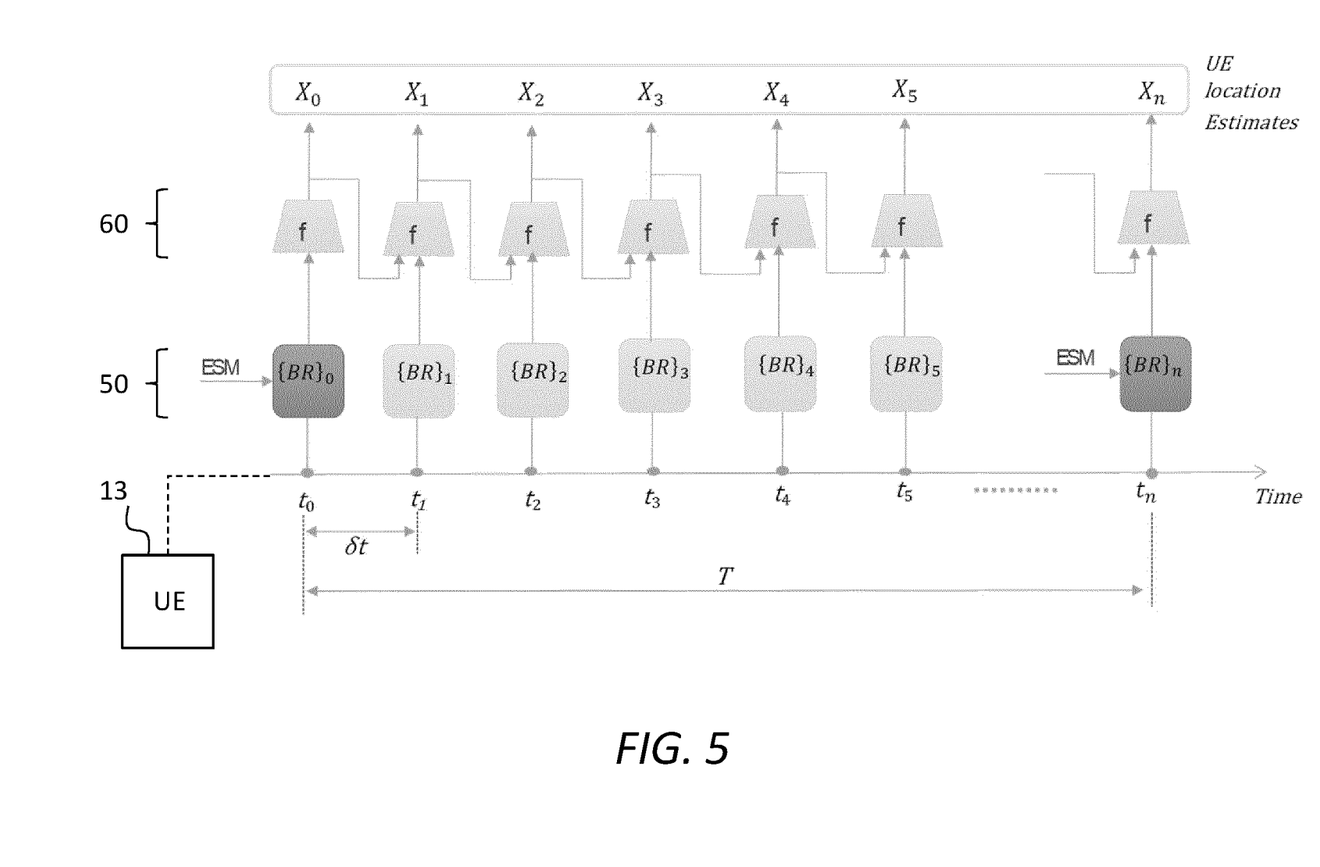
FIG. 5 is a schematic diagram of how the position of user equipment may be determined via Received Signal Received Power measurement reports as a function of time, according to an example embodiment.

FIG. 5 is similar to FIG. 2 in that it depicts schematically an example of the UE 13 sending RSRP measurement reports 50 as a function of time which corresponds also to a motion trajectory. In this case, in accordance with example embodiments, at each time instance t, the RSRP measurement reports 50 are dependent on whether or not an ESM is requested or required, e.g. only at predetermined time instances having the period T. The value of T may be considered a tuning parameter as it tunes the localization accuracy. The position of the UE 13 at sub-intervals (e.g. $t_o+\delta_t$, $t_o+2\delta_t$, ... $t_o T-\delta_t$) within period T is determined as a respective function $f$ 60 of its estimated position at the previous time instance and the reported measurement for the current time. Put another way:

$$X_{t+\delta_t} = f(X_t, BR_{t+\delta_t}).$$

This function $f$ 60 may be determined using a machine learning model. The machine learning model may be a trained model. For example, the machine learning model may comprise a deep neural network architecture, based on a convolutional neural network (CNN) and a recurrent neural network (RNN) architecture. The architecture takes account of the current measurement reporting as well as the previously-estimated position of the UE 13.

Figure 6:
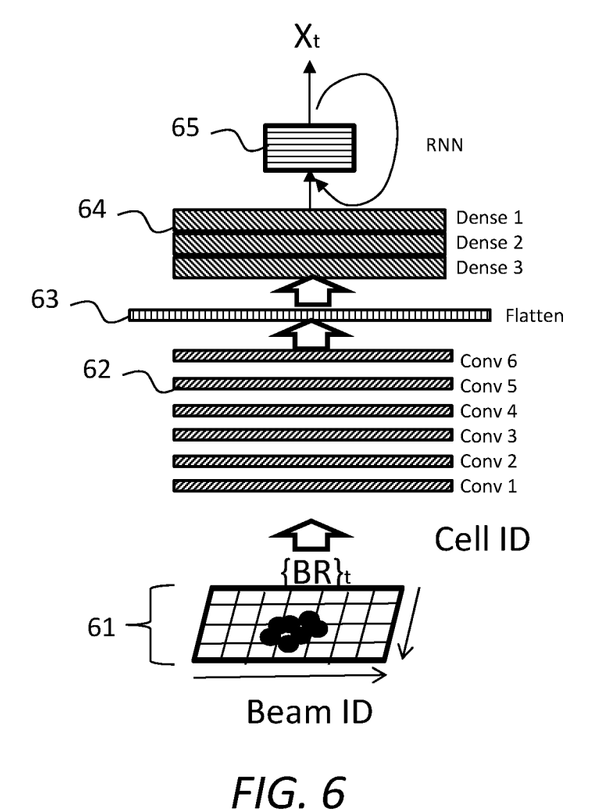
FIG. 6 is a schematic diagram of a neural network that may be trained and employed for inference, according to an example embodiment.

In a simulation, a deep-learning model was trained having the architecture shown in FIG. 6. Data points on a grid 61 represent training data, which training data was passed through six CNN layers 62, a flattening layer 63, and then through three dense fully-connected network layers 63 before passing to an RNN layer 65.

Example parameters of the deep-learning model are specified in table 1 below.

TABLE 1

| Layer | Parameters |
| --- | --- |
| Conv 1 | $N_f = 128$, k = (3, 3), s = (1, 1) |
| Conv 2 | $N_f = 64$, k = (3, 3), s = (2, 2) |
| Conv 3 | $N_f = 32$, k = (2, 3), s = (1, 1) |
| Conv 4 | $N_f = 16$, k = (3, 3), s = (2, 2) |
| Conv 5 | $N_f = 8$, k = (3, 2), s = (1, 1) |
| Conv 6 | $N_f = 2$, k = (3, 3), s = (1, 1) |
| Dense 1 | $N_L = 64$ |
| Dense 2 | $N_L = 16$ |
| Dense 3 | $N_L = 2$ |
| RNN | $N_o = 2$ |

Key:
 $N_f$=number of filters;
 k=kernel size;
 s=strides;
 $N_L$=number of neurons; and
 $N_o$=output dimension For the purpose of training the FIG. 6 model, the data set included 16800 UE data values consisting of the beam RSRP values of the four best beams from the serving cell and the two best neighbouring cells. Test data consisted of 4200 samples.

Mean position error values of the test data were recorded for different values of a time instant t, varying from one to ten, for the following three cases:
 ESM method at all time instances (3 cells*4 beam RSRPs for all values of t);
 No ESM method at any time instance (1 cell*4 beam RSRPs for all values of t); and
 ESM method only at the first time instance of period T (3 cells*4 beam RSRPs at t=0 and 1 cell*4 beam RSRPs at t>0).

Figure 7:
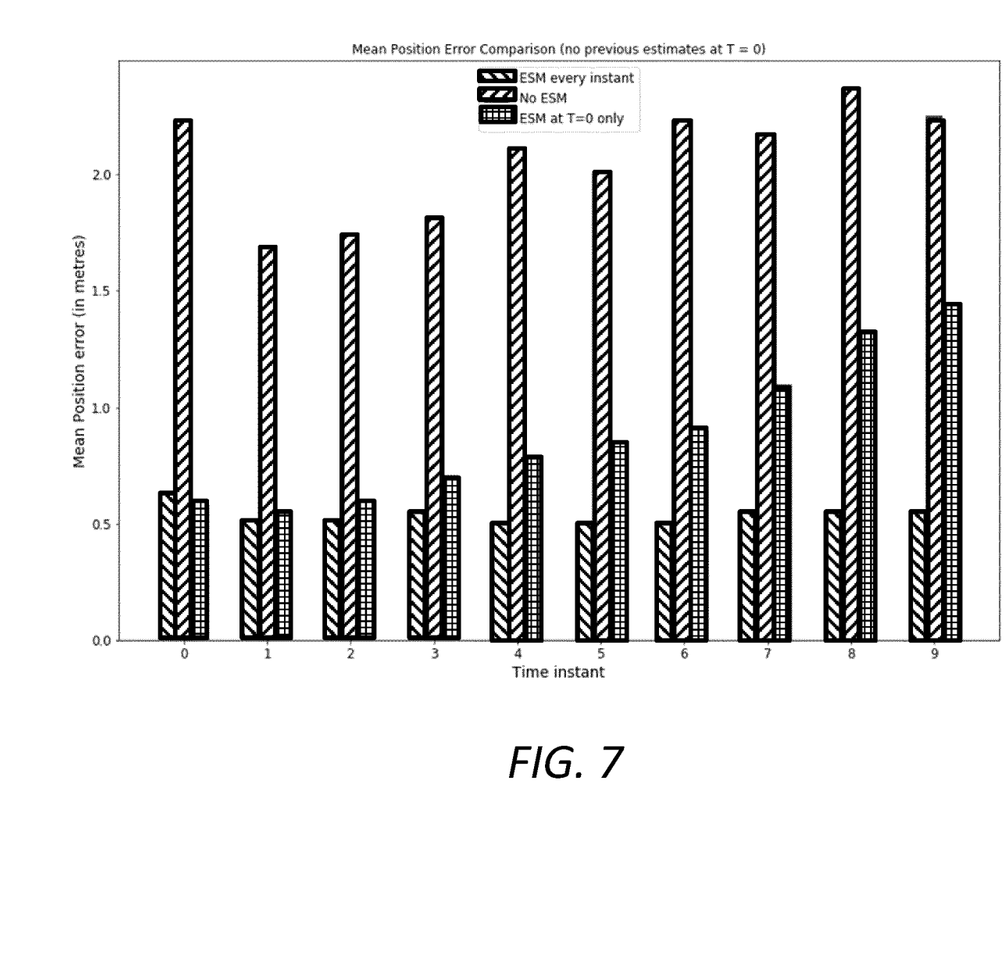
FIG. 7 is a bar chart showing, for three positioning method types, including a method according to an example embodiment, mean position errors for different time instances.

FIG. 7 is a graphical comparison of the achieved mean position error for the three different cases. The extent of the x-axis corresponds to a single time period T such that, in the third case, the ESM method is used at t=0 and no ESM is employed from t=1 until the start of the next period T. In the third case, the larger the value of T, the higher the position error. However, the advantage of using the third case is evident from FIGS. 8A and 8B, which respectively show the percentage signalling overhead and percentage localization accuracy as a function of time.

Figure 8A:
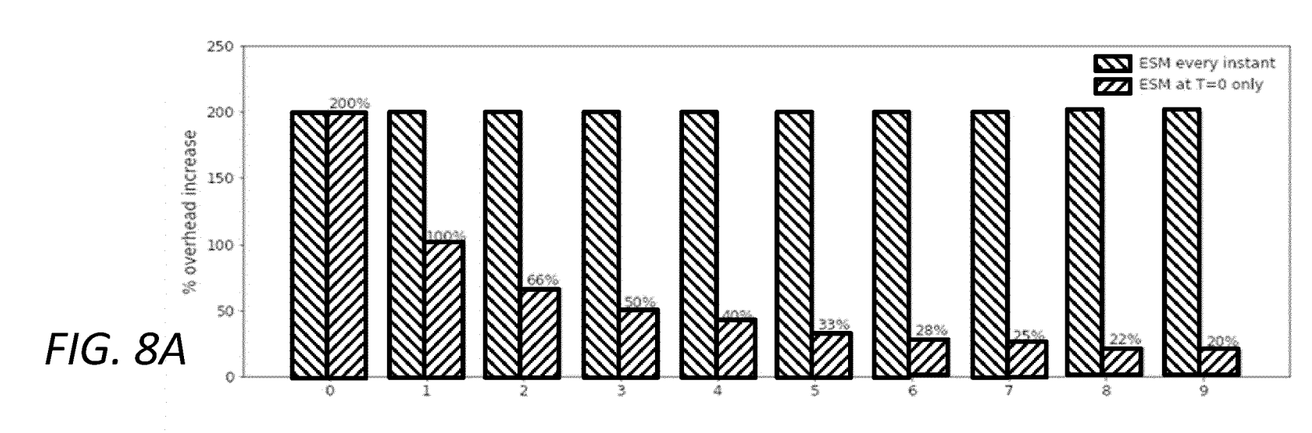
FIG. 8A is a bar chart showing, at different time instances, a percentage overhead increase for a reference positioning method and a positioning method according to an example embodiment.
Figure 8B:
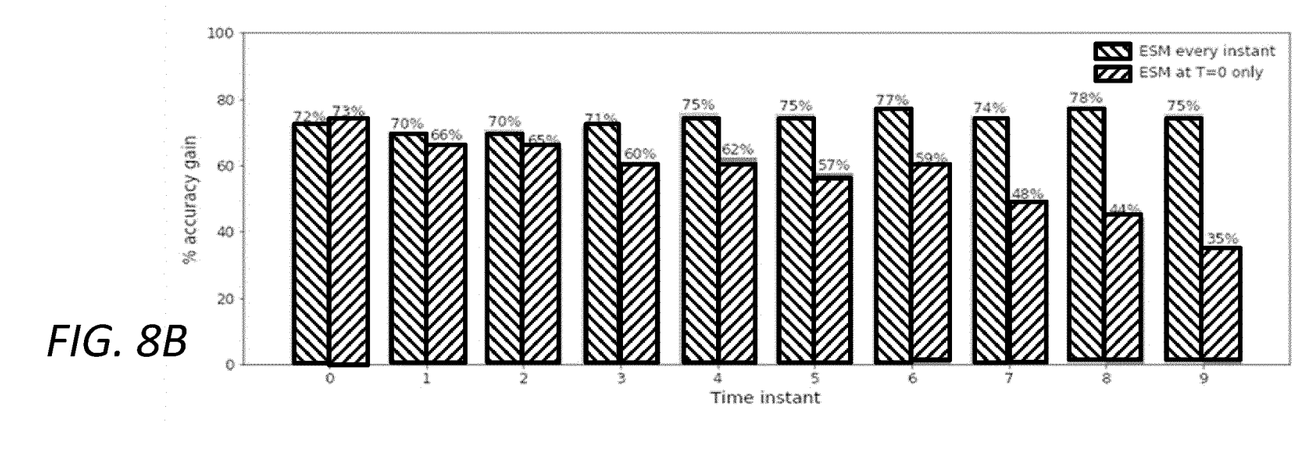
FIG. 8B is a bar chart showing, at different time instances, a percentage accuracy gain for a reference positioning method and a positioning method according to an example embodiment.

In FIG. 8A, the signalling overhead is shown as a percentage of overhead increase compared to the second case with no ESM used at any time. In FIG. 8B, the localization accuracy is shown as a percentage of gain compared to the second case with no ESM used at any time.

Conclusions that may be drawn from the shown results include that the third case provides less accuracy than the first case, but this gap depends on the considered period T. For low period values (T<$_4$), the gap is lower than 10% and reaches 40% for T=9. However, on examining the signalling overhead, the benefit of the using third case becomes clearer and increases with time.

The obtained simulation results clearly show advantages by using the ESM at periodic intervals only, for example advantages in terms of signalling overhead (only 20% of overhead increase for T=9) whilst ensuring localization accuracy over the reference scheme based on a conventionally-reported measurement set.

Figure 9:
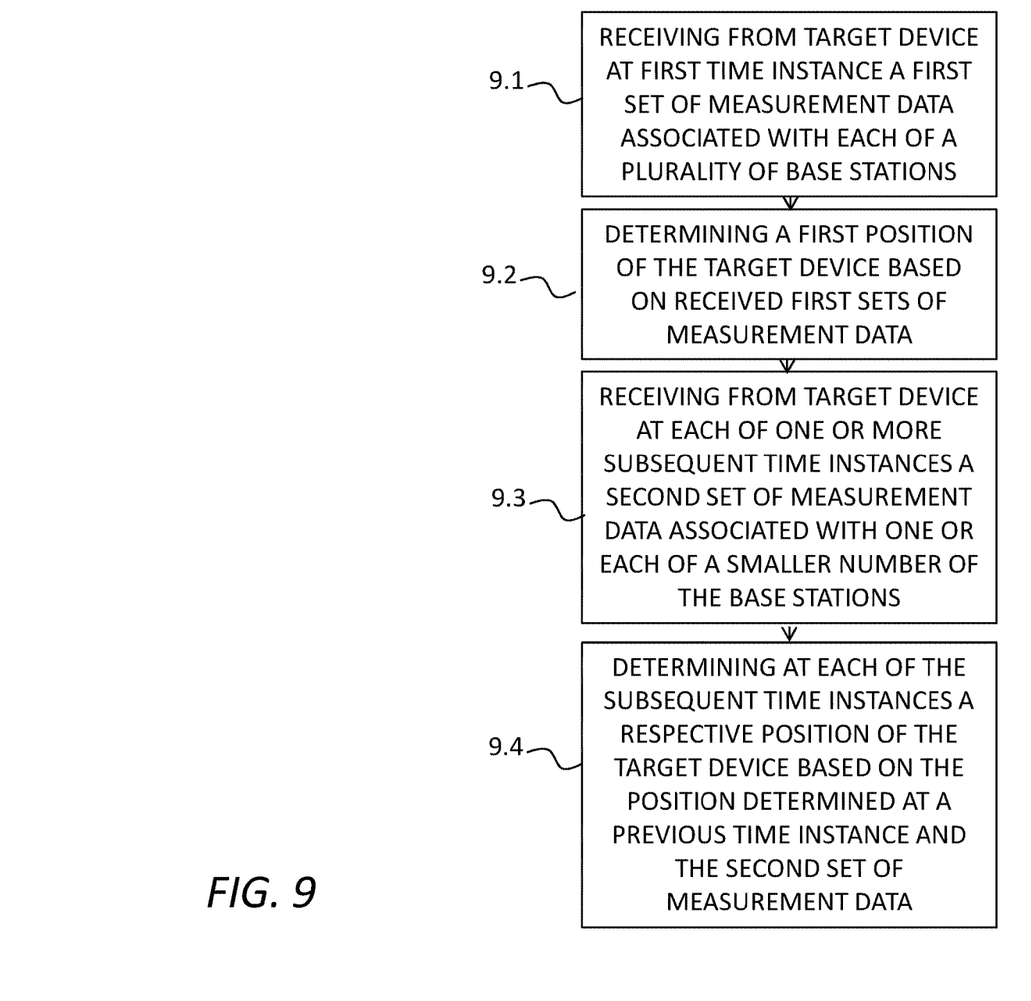
FIG. 9 is a flow chart showing processing operations according to an example embodiment.

FIG. 9 is a flow diagram indicating operations that may be performed in hardware, software, or a combination thereof at the LMF 16 or some other node. The numbering of operations is not necessarily indicative of the order of processing. Further or fewer operations may be provided in some embodiments A first operation 9.1 may comprise receiving from a target device, at the first time instance, a set of first measurement data associated with each of a plurality of base stations.

A second operation 9.2 may comprise determining a first position of the target device based on the received first sets of measurement data.

A third operation 9.3 may comprise receiving from the target device, at each of one or more subsequent time instances, a second set of measurement data associated with one, or each of a smaller number, of the base stations.

A fourth operation 9.4 may comprise determining, at each of the one or more subsequent time instances, a respective position of the target device based on the position determined at a previous time instance and the second set of measurement data.

The operations may further comprise transmitting by the target device of the first sets of measurement data at the first time instance and the second set(s) of measurement data at the subsequent time instances. The first sets of measurement data may be transmitted at repeating periods, and the second set(s) of measurement data may be transmitted at one or more sub-intervals within each period. One second set of measurement data may be received, associated with a serving base station for the target device. The first sets of measurement data may be associated with a serving base station and one or more neighbouring base stations for the target device. The sets may comprise measurement data associated with a plurality of beams transmitted by the base station(s). The first and second sets of measurement data may represent RSRP measurements determined by the target device for reference signals from the base stations.

Figures 10, 11:
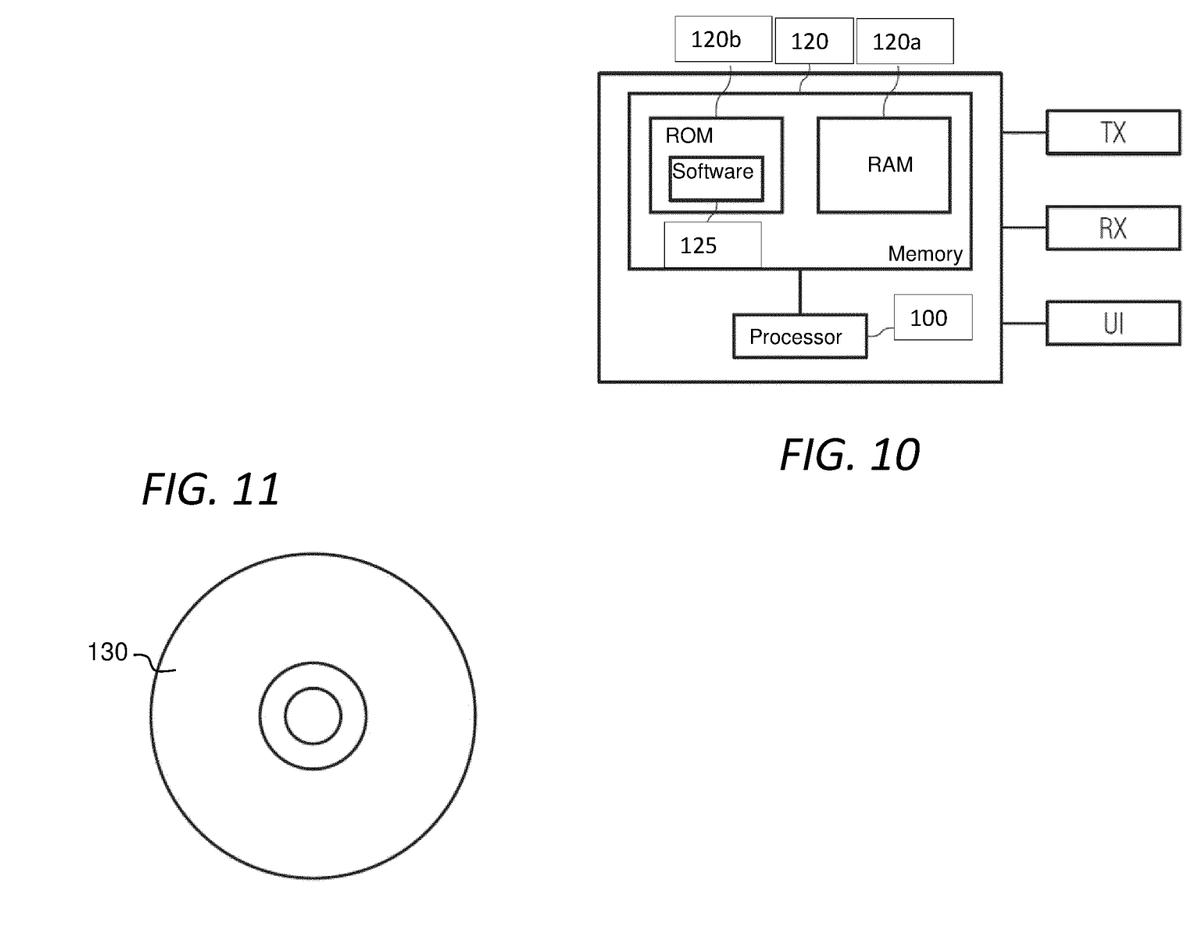
FIG. 10 is an apparatus that may be configured or used to perform example embodiments.
FIG. 11 is a non-transitory medium for storing computer-readable code that may perform example embodiments.

FIG. 10 shows an apparatus according to example embodiment. The apparatus may be configured to perform the operations described herein, for example operations described with reference to FIGS. 3, 4 and/or 9. The apparatus may comprise at least one processor 100 and at least one memory 120 directly or closely connected to the processor. The memory 120 includes at least one random access memory (RAM) 120b and at least one read-only memory (ROM) 120a. Computer program code (software) 125 is stored in the ROM 120b. The apparatus may be connected to a receiver path of a base station in order to obtain LPP layer signals, among others. The apparatus may be connected with a user interface UI for instructing the apparatus and/or for outputting results. However, instead of a UI, the instructions may be input e.g. from a batch file, and the output may be stored in a non-volatile memory. The at least one processor 100, with the at least one memory 120 and the computer program code 125 are arranged to cause the apparatus to at least perform at least the method according to FIG. 5 or any variation thereof as disclosed herein.

FIG. 11 shows a non-transitory media 130 according to some embodiments. The non-transitory media 130 is a computer readable storage medium. It may be e.g. a CD, a DVD, a USB stick, a blue ray disk, etc. The non-transitory media 130 stores computer program code, causing an apparatus to perform the method of FIGS. 3, 4 and/or 9, or any variation thereof as disclosed herein, when executed by a processor such as processor 100 of FIG. 10.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi. Accordingly, a base station may be a BTS, a NodeB, an eNodeB, a gNB, a WiFi access point etc.

A memory may be volatile or non-volatile. It may be e.g. a RAM, an SRAM, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
at least one processor; and
at least one memory storing instructions that, when executed with the at least one processor, cause the apparatus to perform:
receiving from a target device, at a first time instance, a set of first measurement data associated with each of a plurality of base stations, wherein the first sets of measurement data are associated with a serving base station and one or more neighbouring base stations;
determining a first position of the target device based on the received first sets of measurement data;
receiving from the target device, at each of one or more subsequent time instances, a second set of measurement data associated with one or more base stations of a subset of base stations of the plurality of base stations, wherein the subset of base stations comprises fewer base stations than the plurality of base stations, wherein the second set(s) of measurement data are associated with the serving base station; and
determining, at each of the one more subsequent time instances, a respective position of the target device based on the first position determined at a previous time instance and the second set(s) of measurement data.

2. The apparatus of claim 1, wherein the instructions, when executed with the at least one processor, cause the apparatus to perform:
causing transmission, with the target device, of the first sets of measurement data at the first time instance and the second set(s) of measurement data at the one or more subsequent time instances.

3. The apparatus of claim 2, wherein the instructions, when executed with the at least one processor, cause the apparatus to perform:
causing transmission, with the target device, of the first sets of measurement data at repeating periods, and of the second set(s) of measurement data at one or more sub-intervals within each period of the repeating periods.

4. The apparatus of claim 1, wherein only one second set of measurement data is received, associated with the serving base station for the target device.

5. The apparatus of claim 1, wherein the first and second sets of measurement data represent reference signal received power measurements determined with the target device for reference signals from the plurality of base stations.

6. The apparatus of claim 1, wherein a determined position at previous time instances are stored in a memory device of the apparatus.

7. The apparatus of claim 1, wherein the determining, at each of the one or more subsequent time instances, the respective position of the target device is based on a machine-learning model that determines a functional relationship of the respective position to the first position determined at the previous time instance and the second set(s) of measurement data.

8. The apparatus of claim 7, wherein the machine-learning model comprises a convolutional neural network and a recurrent neural network.

9. The apparatus of any claim 1, comprising a positioning node of a radio communications network.

10. A method, comprising:
receiving from a target device, at a first time instance, a set of first measurement data associated with each of a plurality of base stations, wherein the first sets of measurement data are associated with a serving base station and one or more neighbouring base stations;
determining a first position of the target device based on the received first sets of measurement data;
receiving from the target device, at each of one or more subsequent time instances, a second set of measurement data associated with one or more base stations of a subset of base stations of the plurality of base stations, wherein the subset of base stations comprises fewer base stations than the plurality of base stations, wherein the second set(s) of measurement data are associated with the serving base station; and
determining, at each of the one or more subsequent time instances, a respective position of the target device based on the first position determined at a previous time instance and the second set(s) of measurement data.

11. The method of claim 10, further comprising:
causing transmission, with the target device, of the first sets of measurement data at the first time instance and the second set(s) of measurement data at the one or more subsequent time instances.

12. The method of claim 11, further comprising:
causing transmission, with the target device, of the first sets of measurement data at repeating periods, and of the second set(s) of measurement data at one or more sub-intervals within each period of the repeating periods.

13. The method of claim 10, wherein only one second set of measurement data is received, associated with the serving base station for the target device.

14. The method of claim 10, wherein the first and second sets of measurement data represent reference signal received power measurements determined with the target device for reference signals from the plurality of base stations.

15. The method of claim 10, further comprising:
storing a determined position at previous time instances in a memory device.

16. The method of claim 10, wherein the determining, at each of the one or more subsequent time instances, the respective position of the target device is based on a machine-learning model that determines a functional relationship of the respective position to the first position determined at the previous time instance and the second set(s) of measurement data.

17. The method of claim 16, wherein the machine-learning model comprises a convolutional neural network and a recurrent neural network.

18. A non-transitory computer readable medium comprising program instructions stored thereon for performing at least the following:
- receiving from a target device, at a first time instance, a set of first measurement data associated with each of a plurality of base stations, wherein the first sets of measurement data are associated with a serving base station and one or more neighbouring base stations;
- determining a first position of the target device based on the received first sets of measurement data;
- receiving from the target device, at each of one or more subsequent time instances, a second set of measurement data associated with one or more base stations of a subset of base stations of the plurality of base stations, wherein the subset of base stations comprises fewer base stations than the plurality of base stations, wherein the second set(s) of measurement data are associated with the serving base station; and
- determining, at each of the one or more subsequent time instances, a respective position of the target device based on the first position determined at a previous time instance and the second set(s) of measurement data.

* * * * *